Feb. 13, 1962 C. P. GROSS 3,020,813
JOINT CLEANING AND FILLING MACHINE
Filed July 23, 1956 3 Sheets-Sheet 1
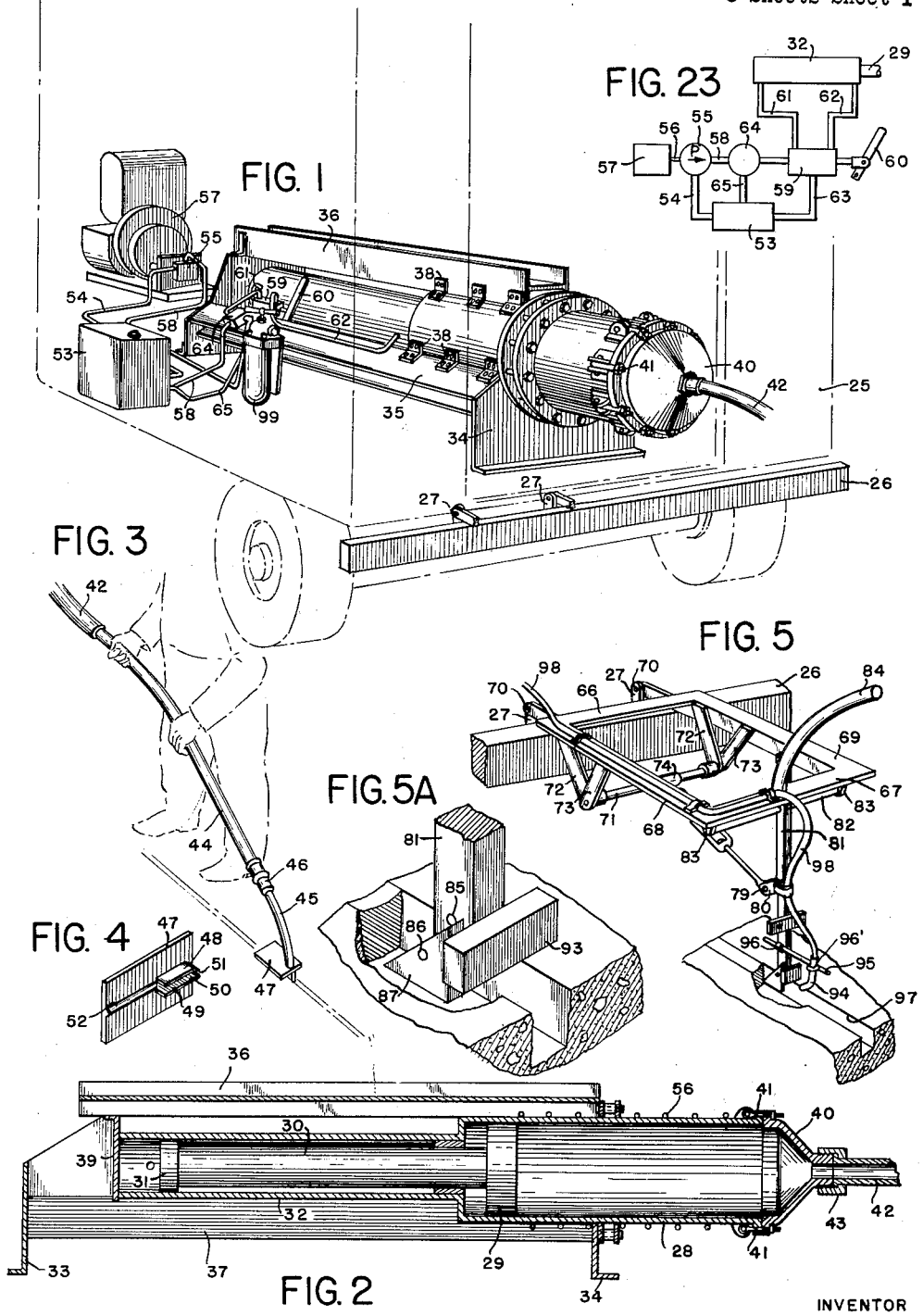
INVENTOR
CHARLES P. GROSS
BY A. Yates Dowell
ATTORNEY

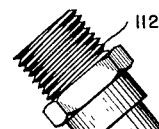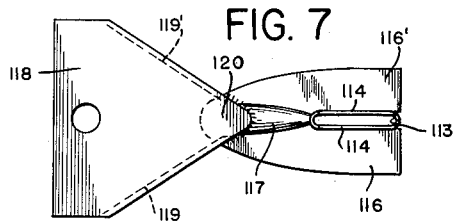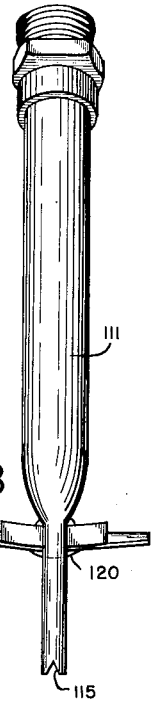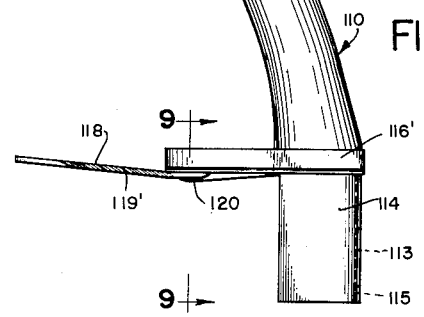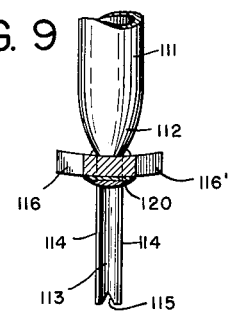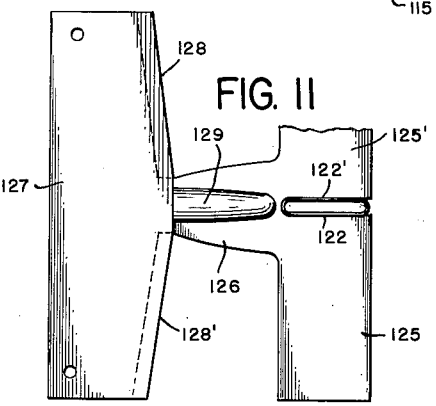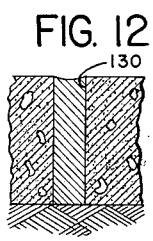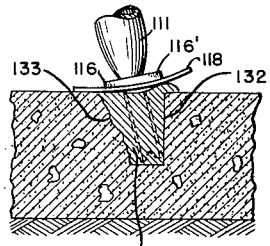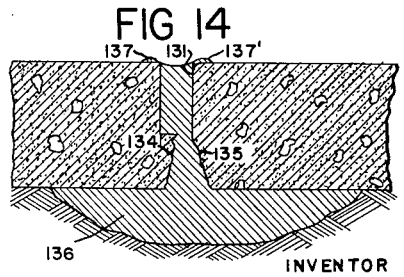

Feb. 13, 1962   C. P. GROSS   3,020,813
JOINT CLEANING AND FILLING MACHINE
Filed July 23, 1956   3 Sheets-Sheet 3
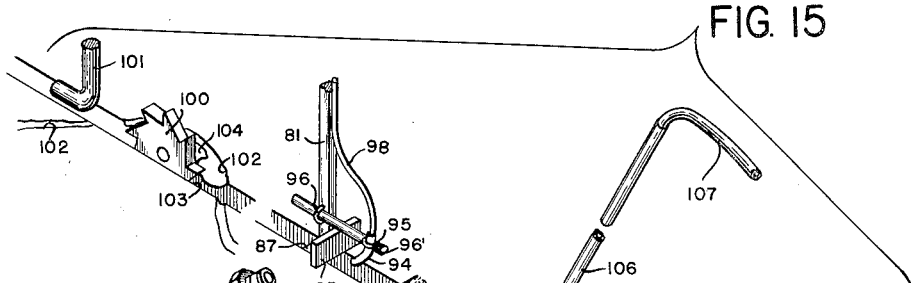
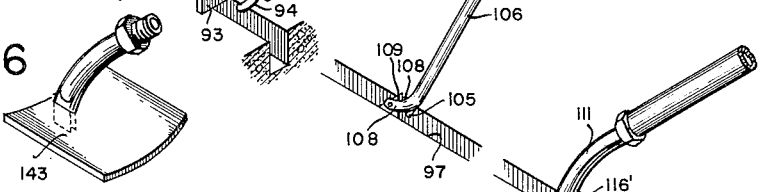
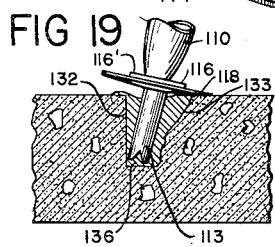
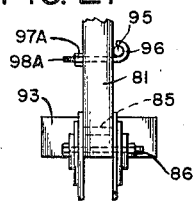
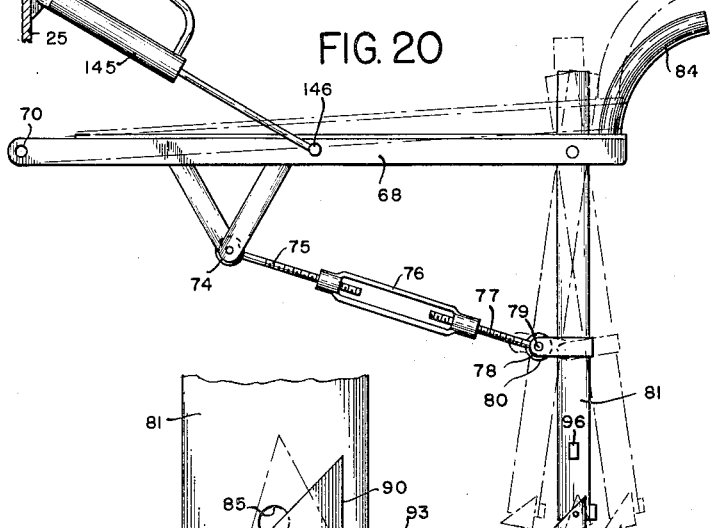
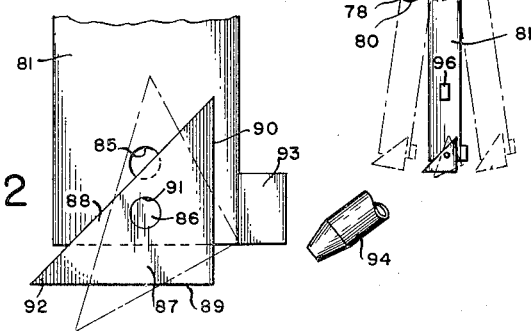
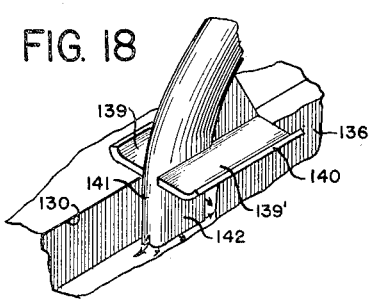
INVENTOR
CHARLES P. GROSS
BY *Ayates Dowell*
ATTORNEY

United States Patent Office 3,020,813
Patented Feb. 13, 1962

3,020,813
JOINT CLEANING AND FILLING MACHINE
Charles P. Gross, 4205 Brigantine Blvd., Brigantine, N.J.
Filed July 23, 1956, Ser. No. 599,594
3 Claims. (Cl. 94—39)

This application relates to pavements and more particularly to the maintenance of water-tight joints between sections of pavement.

Heretofore, joints in pavement have been filled with heat softenable material such as tar and asphalt, and cracks either intentionally formed in concrete or resulting from stresses and strains due to heating and cooling have been filled with material by pouring the filling material in a soft state. However, this heat softenable filling material has been found to be entirely unsatisfactory for airplane runways, particularly where jet planes give off intense heat which melts the soft material opening passages for water to penetrate below the pavement and upon freezing of such water, the pavement breaks up. Although various efforts have been made to overcome this problem, none has been successful until the present invention.

An object of the present invention is to overcome the defects of the prior art and to provide an apparatus and method for effectively cleaning joints in pavement, and thereafter filling the joints with a material which will withstand heating and cooling and will maintain a tight seal at all times.

Another object of the invention is to provide a nozzle for applying highly viscous material into a groove or crack to completely fill such groove or crack.

A further object is to provide a cleaning device for effectively cleaning a groove regardless of the precise shape of such groove and to remove all previously used filling to permit direct application of a new filling material to the original pavement.

Another object is to provide means for dispensing highly viscous material at low temperatures without requiring heating thereof.

A further object is to provide a high pressure dispensing unit suitable for forcing heavy viscous material through a nozzle at a rate sufficient to economically fill grooves or cracks in pavement without interfering with the use of such pavements.

Another object of the invention is to provide a method and means to maintain a pavement in first class condition with a minimum of labor and expense.

Other and further objects will be apparent as the description proceeds and upon reference to the drawing wherein;

FIG. 1 is a perspective of the dispensing unit according to the present invention mounted in a truck shown in phantom for dispensing the viscous joint filling material to a nozzle;

FIG. 2, a longitudinal vertical section of the dispensing unit shown in FIG. 1;

FIG. 3, a nozzle applied to the end of a hose for applying joint filling material in a groove;

FIG. 4, a perspective of the under surface of the nozzle shown in FIG. 3;

FIG. 5, a perspective view of the joint cleaning device shown mounted on a fragment of a rear transverse member of a traction vehicle such as a truck (not shown).

FIG. 5A, a perspective of a section of pavement showing how the joint is cleaned;

FIG. 6, a side elevation of one form of nozzle;

FIG. 7, a bottom view of the nozzle of FIG. 6 showing the closed front and open back and the rearwardly extending plate;

FIG. 8, a front view of the nozzle in FIG. 6;

FIG. 9, a sectional view from the rear of the nozzle assembly of FIG. 6 taken substantially on line 9—9 thereof;

FIG. 10, a side elevation of another form of nozzle with a blade having diverging scraping portions;

FIG. 11, a bottom view of the nozzle according to FIG. 10;

FIG. 12, a section of a fragment of pavement showing a joint or crack filled by the method and apparatus of the present invention;

FIG. 13, a joint having spalled portions filled by the apparatus and method of the present invention;

FIG. 14, a section of a fragment of pavement showing a joint extending completely through the pavement and filled with material which passes completely through the joint to fill voids under the pavement;

FIG. 15, a diagrammatic illustration of a sequence of operations performed by the present equipment in filling joints;

FIG. 16, a perspective of another form of nozzle;

FIG. 17, a perspective of still further form of nozzle;

FIG. 18, a perspective view of a section of pavement showing a nozzle filling a groove and how the workmen can observe when the groove is properly filled;

FIG. 19, a view showing how the nozzle fills a groove with spalled portions of concrete adjacent the groove;

FIG. 20, a side elevation of the framework with a modified mounting of the scraper supporting bar shown in FIG. 5 and illustrating the various adjustments thereof;

FIG. 21, a fragmentary front elevation of the scraper device of FIG. 18 and showing a number of blades secured thereon;

FIG. 22, a side elevation of the gouger in position in a crack and showing how the movement of the blade is limited by the stop; and FIG. 23, a diagrammatic illustration of the hydraulic system for the dispensing unit.

Briefly, the present invention includes a method for cleaning joints in pavement to remove all of the previously used joint filling material and to remove all loose pavement or other matter and to fill the cleaned groove by means of an extremely viscous material forced out of a nozzle having open bottom and back with the nozzle being adapted to fit into the groove, and as the groove is filled, the nozzle is pushed forwardly by the filling material. The nozzle includes rearwardly and sidewardly extending portions for pressing the filling material and confining the filling material into the groove so that a convex joint may be obtained and also permitting some material to be raised above the pavement and to completely cover the corner of the pavement at the groove to effectively prevent the passage of water through such joint.

For cleaning a groove or joint a frame may be pivotally mounted on the rear of a truck for movement about a horizontal axis transverse to the direction of movement, said frame having a downwardly extending leg which may be adjusted as to its angular and lateral positions and the lower end of such leg preferably carrying one or more gouging implements for extension into the groove to effectively remove material from such groove while a nozzle of compressed air is preferably adjustably carried by said leg for forcing air behind such gouging tool to remove dirt, portions of broken pavement, loosened filling material, and the like.

The invention also includes a device for forming grooves of sufficient size by means of a cutter which may pass through the area of cracked concrete so that the cracked portions may be removed and the resulting groove filled with filling material.

A further feature of the invention is a hand scraping implement carrying a nozzle for compressed air for additionally cleaning a groove prior to the application of the filling material with the nozzle, such filling material being forced at extremely high pressure in the neighborhood of 40 tons to the nozzle.

Briefly stated, the present invention relates to preventing seepage of moisture through cracks and grooves in pavements, particularly pavements subject to intense changes in temperature, and includes apparatus and method for cleaning the grooves and joints and filling such cleaned grooves with a material which will withstand intense heat and will maintain a liquid-tight joint at all times. The joint is effectively cleaned by means of one or more gouging blades pivoted on the lower end of a downwardly extending bar, which bar is pivotally connected to and transversely slidable on a frame pivotally connected to a traction vehicle whereby suitable guiding of the bar will maintain the gouging blade at the bottom of the groove thereby effectively removing material from the groove while an air blast provided behind the gouging blade completely removes all loosened material. The cleaned joint or groove is then filled with a highly viscous material in a cold condition by means of a flattened nozzle adapted to be received in the groove with said flattened nozzle having a front wall and side walls and being open at the bottom and rear. The nozzle preferably has secured thereto in spaced relation to the open bottom a guiding blade for contacting the adjacent portions of the pavement to limit the insertion of the nozzle and also to confine the filling material in the groove and such nozzle is connected by means of flexible tubing to a source of filling material and the filling material is forced into the tube and out of the nozzle by means of a high pressure dispensing means capable of producing pressures in the order of 42 tons which urges the filling material between the nozzle and into the furthermost recesses in the crack or groove and into voids beneath the pavement when such voids exist. An operator guiding the nozzle may observe the effective filling of the groove by noting when the filling material begins to ooze out of the front wall of the nozzle indicating that the groove is filled and the force on the front wall of the nozzle urges the nozzle forwardly so that the nozzle is self feeding with limited attention required of the operator. A blade extending from the nozzle is suitable for confining excess material to the closely adjacent portions of the pavement and a hand trowel may be used thereafter to finish the seal and the filling material is preferably continuous around the edges or corners of the pavement at the groove to prevent water from seeping into the groove.

The nozzle may also be provided with scraping devices for scraping excess material and the nozzle blade is preferably provided with a convex portion to make a finished appearance on the filling material. The length of the nozzle below the blade is selected in accordance with the depth of the groove.

Referring more particularly to the drawing, a truck 25 shown in phantom having a rear bumper rail 26 on which a pair of upwardly extending lugs 27, 27 are mounted serves as a traction vehicle and also as a support for joint filling material dispensing means. The joint filling material being dispensed from a cylinder 28 having a movable piston 29 slidable therein, the piston 29 being operated by means of a piston rod 30 driven by a hydraulic piston 31 operating in a hydraulic cylinder 32, the hydraulic cylinder 32 and the material receiving cylinder 28 being supported on transverse members 33 and 34 connected together by longitudinally extending I beams 35, 36 and 37 fixed to the material receiving cylinder 28 by means of angle brackets 38 or the like and to the front end 39 of the hydraulic cylinder 32 to be capable of withstanding extremely high forces, the forward end of hydraulic cylinder 32 being closed by the transverse front end plate 39 fixed to the cross member 33 and to the I beam members. Secured and closing the rear end of the material receiving cylinder 28 is a funnel-shaped closure member 40 removably attached by its larger end to the rear end of cylinder 28 by means of pivotal eye bolts 41 in such a way as to permit removal of the funnel-shaped closure 40. Connected by means of a union 43 to the reduced end of the funnel 40 is a flexible tube 42 adapted to withstand extremely high pressure which hose 42 is connected to a tubular handle 44 which in turn is connected to a tubular portion 45 of a nozzle by means of a coupling 46. The nozzle shown in FIGS. 3 and 4 including a horizontally extending plate 47, the nozzle outlet 50 projecting beyond the plate 47 and said outlet including side walls 48 and 49 and a front wall having a notch 51 at the lower end thereof, said nozzle being open at the bottom and rear. A shaping rib 52 extending rearwardly of the nozzle outlet below the plate 47 produces a depression in the material applied in a joint.

It will be apparent that the equipment thus far described is particularly useful for filling joints in new construction which does not require that the joints be cleaned.

For obtaining the high pressures required on the filling material, hydraulic cylinder 32 is supplied with hydraulic fluid and from a hydraulic reservoir 53 through a line 54 to a hydraulic pump 55 driven through suitable gearing from a shaft 56 of a motor generator unit 57. The hydraulic fluid under pressure being fed from the pump 55 by means of a conduit 58 to a valve 59 controlled by valve lever 60, of conventional design, and serving to supply hydraulic fluid under pressure to the forward end of the cylinder 32 by means of conduit 61 and the hydraulic fluid being alternately fed from the valve 59 through a conduit 62 to the rear end of the hydraulic cylinder whereby the piston 29 of the hydraulic cylinder may be moved rearwardly or forwardly, respectively, the cylinder fluid being discharged from either end of the cylinder through conduits 61 or 62 to valve 59 and being returned by a conduit 63 from valve 59 to the sump 53. In the line 58 a conventional bypass valve 64 may be provided in a conduit 65 leading from the conduit 58 to return the hydraulic fluid which has a pressure above the setting of bypass valve 64 to the sump 53.

From the above it is believed that the operation of piston 31 should be apparent and since piston 31 is connected to piston 29 in the material dispensing cylinder 28, the piston 29 will be moved simultaneously, and when joint filling material is placed in such cylinder 28 it will be forced into the high pressure flexible tubing 42.

From the tube 42 the joint filling material passes into the handle or wand 44 and thence to the nozzle 50 as previously explained.

Prior to filling the joints, the joints are effectively cleaned by suitable apparatus such as that shown in FIGS. 5, 5A, 15 and 22, inclusive. Referring to FIG. 5, a rectangular framework including rear end members 66, 67 and side members 68, 69 is pivotally mounted with extension side members 68, 69 by pivot pins 70, 70 to the upstanding legs 27 on the rear bumper rail or similar member 26 of a conventional tow vehicle such as a truck 25 and such frame may pivot about said pins 70, 70 as shown in dotted lines in FIG. 20. Supported adjacent the front of the rectangular framework is a transversely positioned bar 71 supported by downwardly extending struts 72, 73 from each side of the frame and such bar carries a sliding collar 74 fixedly connected to a threaded rod 75 connected by a turnbuckle 76 to a second rod 77 threaded in the opposite direction from the thread of rod 75, said rod 77 being provided with an eye 78 for engagement with a pin 79 supported in lugs 80, 80 fixedly secured to a downwardly extending bar 81 said bar 81 being pivotally and slidably mounted at its upper end on a transverse rod 82 supported from downwardly depending legs 83, 83 adjacent the rear member 67 of the rectangular frame whereby said bar 81 may slide transversely along said rod 82, the link formed by turnbuckle 76 and its cooperating threaded rod 75 and 77 being also movable transversely slidable by collar 74 sliding on rod 71. A handle 84 may be fixed to the rear cross member 67 permitting a workman to raise and lower the frame and, if desired, such handle 84 may be secured to the bar 81. The lower end of the rod 81 is provided with one or more apertures 85 adapted to receive a pivot pin 86 which pivot pin is designed to pivotally mount triangular shaped gouge elements 87 either singly, in pairs, or in any multiple arrangement. Each gouge element 87 preferably is of triangular shape plate as shown and includes a long edge 88 and two short edges 89 and 90 with a pivot receiving bore 91 therethrough closely adjacent the side 88 and substantially midway between the ends thereof. One size of plate which has been found particularly desirable has the side 88 between 3½ and 4 inches long, the sides 89 and 90 each approximately 2 inches long and the bore 91 approximately ½ inch from the side 88. In use the gouger blade 87 has its side 89 engaging the bottom of a groove which is being cleaned and the point 92 thereof serves to loosen the material with which it comes in contact and if a sharp obstruction is contacted the gouger blade 87 may pivot about pin 86 and by such action the side 88 serves to provide additional leverage for loosening such obstruction and if the obstruction still continues to urge the gouger 87 so that the point 92 moves further rearwardly to the dotted line position shown in FIG. 22, the rear edge 90 engages a pad or stop 93 fixed to the bar 81 and extending transversely thereof so as to project from both sides to be engageable with gouger elements 87 on either side of bar 81 to prevent such gouger elements from moving beyond the dotted line position shown in FIG. 22. The bar 81 may be of a size 2¼ inches by 2¼ inches and the pad or stop 93 may be ¾ inch by 1½ inches and secured by any suitable means such as welding to the lower end portion of the bar 81.

Although the pivotal movement of the gouger blade 87 normally dislodges all obstruction, in some instances the entire blade may be pushed out of the groove and this is permitted because of the pivotal mounting between the sides of the rectangular frame and the towing vehicle since a rearward force on the gouger blade tends to cause an upward pivotal movement of the frame about the pivots 70, 70. The pad or stop 93 serves to prevent excessive pivotal movement of the gouging blade 87 and also serves as a limit stop to limit the extent of insertion of the gouger blade into the groove. The position of the gouger blade and its depth into the groove can be controlled by mounting the blade supporting pivot pin 86 in different apertures 85 in the lower end of the bar 81. For additionally cleaning the groove, an air nozzle 94 is mounted on the end of a bendable rod 95 which is adjustably connected to the bar 81 (FIG. 21) by a clamp 96 adjustably secured by a nut 97A on the threaded shank portion 98A of such clamp 96 whereby the angular position of the rod 95 may be adjusted as well as the rearward extension of such rod 95. The nozzle 94 is fixed to the rod 95 by a suitable clamp 96' which may be adjustable if desired. It is possible to adjust the position of the nozzle by sliding movement of the rod 95 with respect to clamp 96 and by the pivotal movement of clamp 96 and 96' and also by bending the rod 95 to position the nozzle 94 so that the blast of air will be directed into the groove 97 of the pavement, whereby the material loosened by the gouge blade 87 or any other loose material in the groove is effectively removed by the blast of air from the nozzle 94. The nozzle 94 is supplied with air by means of a flexible high pressure air hose 98 passing up along the bar 81 and thus along the rectangular frame to a source of air pressure which may come from a compressed air bottle 99 suitably supplied with compressed air from an air compressor pump or the like so that pressure of air supply of such nozzle may be controlled within wide limits, such air pressure being particularly effective in a range from 100 to 300 lbs. per square inch.

In some types of work, it may be necessary to cut a groove and this may be done by a power driven cutter 100 suitably driven from a source of power by suitable machine such as that shown in my previous application, Serial No. 326,471 filed December 13, 1952, of which this application is a continuation in part and such cutter may be guided by a guiding gouger element 101 as shown in such application or the guiding gouging element 101 may be omitted. The cutter 100 may also be used where an irregular crack, such as that shown at 102 in FIG. 15 is to be filled and the crack is so irregular as to prevent effective filling. Irregular cracks have been filled by diluting the filling material or otherwise softening the material as with heat sufficiently for pouring in the usual manner into the irregular crack, but since such method has frequently been ineffective to seal a crack, applicant has found that a straight groove 103 may be cut by means of a cutting tool such as that shown at 100 (FIG. 15) to provide a relatively straight groove and after such groove has been cut the gouging device shown in FIGS. 5, 5A, 15 and 20 may be passed over the area of the crack carrying one or a plurality of gouger blades 87 so that the irregular portions 104 may be removed forming a cavity. A plurality of gouger blades are shown in FIG. 21 on the bar 81 and some of such gouger blades may pass into the groove 103 while other gouger blades may engage and loosen portions of the material such as the portions 104 adjacent the groove 103 and between the crack 102 and the groove 103 and by this equipment the crack may be effectively cleaned so that filling material may be applied thereto in the manner of filling spalls as shown in FIG. 13, for example.

In some uses the nozzle 94 may be omitted from the groove cleaning unit and air may be forced into the groove by means of an air jet 105 at the lower end of a hollow handle 106 which is supplied with compressed air through a high pressure flexible hose 107 for effectively forcing air into the groove 97. The handle 106 may have its handle split to provide tines 108 between which the gouger blade 109 may be mounted for manual operation and guidance by a workman who grasps the handle in any suitable manner and by proper manipulation loosens and removes the material with the gouger blade 109 and air jet 105.

After the joint or groove is completely cleaned, the joint filling material is applied in the joint by means of one or more of a suitable nozzle size and shape for the groove being filled.

One nozzle unit 110 includes a tubular shank portion 111 having coupling means 112 at the upper end thereof and said tubular shank portion 111 is flattened at the lower end thereof with a gradual tapering portion 112 between the shank 111 and the nozzle tip. The nozzle tip includes a front wall 113 and side walls 114, the front wall being provided with a notch 115 at its lower end, the nozzle being open at its rear and its bottom. Fixed to shank 111 below the tapering portion 112 is a guiding plate having wings 116, 116' forming a dihedral angle embracing the nozzle and adapted to contact the pavement adjacent the groove, said plate including a rear extending portion 117 to which a triangular scraping blade 118 is fixedly secured by welding or the like and such scraping blade is provided with bevel edges 119, 119' adapted to scrape off excess material, the blade 118 being preferably arranged at a slight angle to the guiding wings 116 and 116' (see FIG. 6). A downwardly extending convex portion 120 is preferably provided between the rear of the nozzle and the scraping blade 118 and such projection may simply be a round knob on the front end of the blade 118 or it may be a rib extending rearward to effectively produce a concave portion in the filling material of a groove joint as shown in FIGS. 12 and 14, for example.

Another form of nozzle shown in FIG. 10 includes a shank 121 converging into a nozzle having side walls 122, 122', a front wall 123 having a notch 124 at its lower end, said nozzle being open at its bottom and its rear and with the nozzle extending through a plate having wings 125, 125' and a rearwardly extending portion 126 connected to a transverse blade 127 having bevel cutting edges 128, 128' arranged in rearwardly diverging relation. The underside of the rearwardly extending portion 126 is preferably provided with a convex rib 129 extending from the nozzle to the blade to provide a concave finish in the joints as shown in FIGS. 12 to 14, inclusive. It will be noted that the sides and front of the nozzle are made of suitable length to project a sufficient distance into the groove to properly fill the grooves and normally the nozzle extends in an upward position to fill irregular grooves such as the groove 133 shown in FIG. 13, and the groove 131 shown in FIG. 14. It will be noted that in FIG. 12, the groove 130 is the conventional expansion joint extending completely through the pavement. Although such expansion joints are frequently filled with cork or fibre glass, such joints may be filled with the extremely viscous joint filling material of the present invention. For a deep groove the nozzle selected is of a length so that the front and side walls project into the groove close to the bottom to effectively fill from the bottom completely to the top.

In FIG. 13, a groove 132 is the conventional construction joint in concrete pavements and cracks resulting from expansion will follow the line of such construction joint and this particular figure shows such construction joint with a spalled portion forming the side 133 of the joint and the same figure shows a rear view of the nozzle of FIG. 6, for example, as being beyond the filled joint and showing the joint in process of being filled. FIG. 19 shows the front view of the joint with the nozzle in elevation. It will be noted that the nozzle 110 is tilted at an angle so that the tip of the nozzle is closely adjacent the side 132 of the groove and the joint filling material is forced into the groove against the bottom and fills the spalled portion 132, the wing portion 116 confining the filling material 136 so as to produce a neat joint as shown in FIG. 13.

In FIG. 14, a construction groove or joint 131 is shown as being cracked along irregular lines 134, 135 at the bottom of said groove and a void having formed under the pavement at said construction joint by seepage of water or the like and such void is filled by joint filling material 136 which is forced downwardly by a nozzle being confined by the wing portions thereof and when the nozzle is of sufficient length the joint filling material is forced through the space adjacent the lines 134 and 135 completely filling the void thereby supporting the edges of the concrete adjacent the groove 131 and the filling is continued to provide a slight excess of material to form the dams 137, 137' on each side of the groove and if such dams are not properly formed or are irregular in shape a trowel, such as the conventional hand trowel 138 (FIG. 15) may be used to smooth out the excess material. It is particularly desirable that the dams 137, 137' extend over the corner of the pavement at the joint to effectively seal the joint filling material and the adjacent pavement. Usually, the corners are rounded in the formation of such construction joint and the filling material provides an effective seal over the corners to prevent water from passing through the groove.

Upon reference to FIG. 18, the progress of filling joints by material 136 is illustrated by a number of arrows from the nozzle to show one way in which the material is believed to be applied. The wings extending at an inclination may serve as skids and the rearwardly extending cover blade pressing a convex surface into the material 136 in the groove, such a nozzle being of slightly different type, having sidewardly extending wings 139, 139' and a rearwardly extending blade portion 140. The nozzle includes a front wall 141 with a notch at its lower end and side walls 142, 142' and is open at the rear and bottom. In each of these forms of the invention the material follows the path generally shown by the arrows in FIG. 18 and when the material begins to ooze out of the notch at the bottom of the front wall the operator knows that the nozzle should be moved forward and this forward motion of the nozzle is assisted by the reaction of the filling material passing out of the open back of the nozzle as previously described.

In FIG. 16 a nozzle is provided with a convex plate 143. The nozzle of FIG. 17 has a plate 144 which is preferably convex on its under surface. In each of the nozzles it will be noted that the operator may observe when the joint filling material begins to ooze out of the front of the nozzle, thereby knowing when to move the nozzle forwardly by the associated handle. The frame for carrying the gouging plate as shown in FIGS. 5 and 20 may be maintained in position by means of a hydraulic cylinder 145 which is pivotally connected to a portion of the truck 25 and having its piston rod pivotally connected to a transversely extending rod 146 fixed to the frame and such hydraulic cylinder may receive its power from any convenient source of pressure under the control of suitable valve mechanism not shown. If desired, this pressure may be maintained by air pressure in a well known manner and a safety bypass valve may be provided as is well known in the hydraulic art.

The material used for joint filling is normally furnished in cylindrical packages covered with cardboard and such covering must be removed prior to insertion of the material into the dispensing cylinder 28. The nature of the filling material is such that it is extremely viscous and resistant to changes in temperature so that it will not be materially weakened by heat encountered in the normal use of pavements and also be of a nature to effectively adhere to the walls of the groove as the pavement expands and contracts to maintain a watertight joint. The material is inserted in the cylinder by removing the funnel-shaped cap 40 and supporting the material in any suitable means and thereafter sliding the cylindrical shaped mass of material into the cylinder 28. One convenient way in which this can be done is by moving a truck on which the cylindrical mass of filling material is supported adjacent the rear of the vehicle 25 and guiding the filling material into the cylinder, thereby reducing the manual effort required for loading the cylinder.

Thereafter the cap 40 is replaced and the hydraulic cylinder is operated to produce the required pressure on the filling material 136 within the cylinder 28.

From the above description the method and apparatus according to the present invention is believed to be described so that one skilled in the art can use the same but it may be noted that an actual working embodiment of the dispensing unit includes a hydraulic cylinder 82 of 8" diameter and a dispensing cylinder 56 of 15" diameter and the motor generator unit used is approximately 12 horse power and capable of delivering hydraulic pressure by means of the hydraulic pump to the hydraulic cylinder at approximately 3000 lbs. per square inch resulting in a total pressure of 42 tons which has been found effective to dispense the joint filling material from the cylinder 28. It is believed that a larger motor would be desirable. The size of the nozzle affects the rate of use of the material and it has been found that the unit will dispense six 55 gal. barrels of joint filling compound in a day of 6 to 7 hours of operation.

Although the nature of the joint filling material is such that it may be dispensed even at low temperatures with the present equipment, it may be advantageous to provide heating means such as the coil 56 surrounding the cylinder 28 which coil may be energized by suitable source of electric power to produce sufficient heat in some operations.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A nozzle for applying extremely viscous joint filling material within a groove to effectively seal such groove when exposed to both high and low temperatures, comprising a blade having two portions arranged at a dihedral angle greater than 180° and having a nozzle projecting from said dihedral substantially bisecting the angle thereof with said nozzle having a forward wall approximately adjacent one end of the apex of said dihedral angle defining the front of said blade, said nozzle having generally parallel side walls and being open at the bottom and rear, said blade having a portion extending rearwardly from said nozzle, and a downwardly projecting convex means on said rearwardly extending portion in alignment with the rearward direction of discharge for engaging the edges of the pavement and depressing the joint filling material into a concave shape, and tubular means to guide the joint filling material into said nozzle.

2. The invention according to claim 1, in which a scraping blade having laterally extending cutting edges secured to said convex means equipped angular blade in trailing relationship.

3. The invention according to claim 2, in which the cutting edges of the scraping blade diverge and are arranged transversely of the center line of the nozzle.

References Cited in the file of this patent

UNITED STATES PATENTS

| | | |
|---|---|---|
| 867,819 | Grundmann | Oct. 8, 1907 |
| 930,374 | Harrop | Oct. 10, 1909 |
| 1,142,022 | Chappell | June 8, 1915 |
| 1,629,784 | Gilbert | May 24, 1927 |
| 1,844,124 | Jordan | Feb. 9, 1932 |
| 1,938,023 | Ingalls | Dec. 5, 1933 |
| 1,945,810 | Holtz | Feb. 6, 1934 |
| 1,946,972 | Heltzel | Feb. 13, 1934 |
| 2,024,938 | Marshall | Dec. 17, 1935 |
| 2,112,489 | Heltzel | Mar. 29, 1938 |
| 2,354,586 | Fischer | July 25, 1944 |
| 2,530,777 | Middlestadt | Nov. 21, 1950 |
| 2,569,682 | Lewis | Oct. 2, 1951 |
| 2,584,993 | Eder | Feb. 12, 1952 |
| 2,633,345 | Nordone | Mar. 31, 1953 |
| 2,636,425 | Heltzel | Apr. 28, 1953 |
| 2,646,012 | Ingalls | July 21, 1953 |
| 2,673,725 | Coates | Mar. 30, 1954 |
| 2,701,134 | Klicpera | Feb. 1, 1955 |

FOREIGN PATENTS

| | | |
|---|---|---|
| 18,516 | Great Britain | Aug. 27, 1903 |